United States Patent [19]
Newell
[11] 3,716,705
[45] Feb. 13, 1973

[54] PATTERN GENERATOR AND METHOD

[75] Inventor: Richard M. Newell, Livermore, Calif.

[73] Assignee: Zeta Research Inc., Lafayette, Calif.

[22] Filed: Aug. 18, 1970

[21] Appl. No.: 64,774

[52] U.S. Cl. ..............235/151, 340/172.5, 340/324 A
[51] Int. Cl. ..............G06f 15/20
[58] Field of Search......235/151, 151.11, 150, 151.1, 235/152; 340/324, 324 A, 172.5; 307/203, 207, 209, 223; 328/92

[56] References Cited

UNITED STATES PATENTS

| | | | |
|---|---|---|---|
| 3,544,972 | 12/1970 | Trousdale | 340/172.5 |
| 3,267,424 | 8/1966 | Brockett et al. | 307/209 X |
| 3,267,459 | 8/1966 | Chomicki et al. | 307/209 X |
| 3,434,113 | 3/1969 | Wiley et al. | 235/151 X |
| 3,459,926 | 8/1969 | Heilweil et al. | 340/324 A |
| 3,546,677 | 12/1970 | Barton et al. | 340/172.5 |

*Primary Examiner*—Joseph F. Ruggiero
*Attorney*—Flehr, Hohbach, Test, Albritton and Herbert

[57] ABSTRACT

Pattern generator and method for generating functional representations of line segments consisting of discrete increments. Standard logic elements are utilized in tree networks which successively combine length and direction input data of different orders of magnitude to produce line segment representations of increasing orders of magnitude. The tree networks are constructed in stages which can readily be cascaded to increase the numbers of increments and line segments which can be generated.

12 Claims, 15 Drawing Figures

INVENTOR.
Richard M. Newell
BY Fleit, Gipple & Jacobson
Attorneys

INVENTOR.
Richard M. Newell
BY Flehr, Hohbach, Test, Albritton & Herbert
Attorneys

INVENTOR.

Richard M. Newell

BY Flehr, Hohbach, Test, Albritton & Herbert
Attorneys

| FUNCTION NO. | $0_1$ | $1_1$ | $2_1$ | $0_2$ | $1_2$ | $2_2$ | $0_3$ | $1_3$ | $2_3$ |
|---|---|---|---|---|---|---|---|---|---|
| 26 | 0 | 0 | 1 | 0 | 0 | 1 | 0 | 0 | 1 |
| 25 | 0 | 0 | 1 | 0 | 0 | 1 | 0 | 1 | 0 |
| 24 | 0 | 0 | 1 | 0 | 0 | 1 | 1 | 0 | 0 |
| 23 | 0 | 0 | 1 | 0 | 1 | 0 | 0 | 0 | 1 |
| 22 | 0 | 0 | 1 | 0 | 1 | 0 | 0 | 1 | 0 |
| 21 | 0 | 0 | 1 | 0 | 1 | 0 | 1 | 0 | 0 |
| 20 | 0 | 0 | 1 | 1 | 0 | 0 | 0 | 0 | 1 |
| 19 | 0 | 0 | 1 | 1 | 0 | 0 | 0 | 1 | 0 |
| 18 | 0 | 0 | 1 | 1 | 0 | 0 | 1 | 0 | 0 |
| 17 | 0 | 1 | 0 | 0 | 0 | 1 | 0 | 0 | 1 |
| 16 | 0 | 1 | 0 | 0 | 0 | 1 | 0 | 1 | 0 |
| 15 | 0 | 1 | 0 | 0 | 0 | 1 | 1 | 0 | 0 |
| 14 | 0 | 1 | 0 | 0 | 1 | 0 | 0 | 0 | 1 |
| 13 | 0 | 1 | 0 | 0 | 1 | 0 | 0 | 1 | 0 |
| 12 | 0 | 1 | 0 | 0 | 1 | 0 | 1 | 0 | 0 |
| 11 | 0 | 1 | 0 | 1 | 0 | 0 | 0 | 0 | 1 |
| 10 | 0 | 1 | 0 | 1 | 0 | 0 | 0 | 1 | 0 |
| 9 | 0 | 1 | 0 | 1 | 0 | 0 | 1 | 0 | 0 |
| 8 | 1 | 0 | 0 | 0 | 0 | 1 | 0 | 0 | 1 |
| 7 | 1 | 0 | 0 | 0 | 0 | 1 | 0 | 1 | 0 |
| 6 | 1 | 0 | 0 | 0 | 0 | 1 | 1 | 0 | 0 |
| 5 | 1 | 0 | 0 | 0 | 1 | 0 | 0 | 0 | 1 |
| 4 | 1 | 0 | 0 | 0 | 1 | 0 | 0 | 1 | 0 |
| 3 | 1 | 0 | 0 | 0 | 1 | 0 | 1 | 0 | 0 |
| 2 | 1 | 0 | 0 | 1 | 0 | 0 | 0 | 0 | 1 |
| 1 | 1 | 0 | 0 | 1 | 0 | 0 | 0 | 1 | 0 |
| 0 | 1 | 0 | 0 | 1 | 0 | 0 | 1 | 0 | 0 |

INVENTOR

Richard M. Newell

BY Flehr, Hohbach, Test, Albritton & Herbert
Attorneys

INVENTOR

Richard M. Newell

BY Flehr, Hohbach, Test, Albritton & Herbert
Attorneys

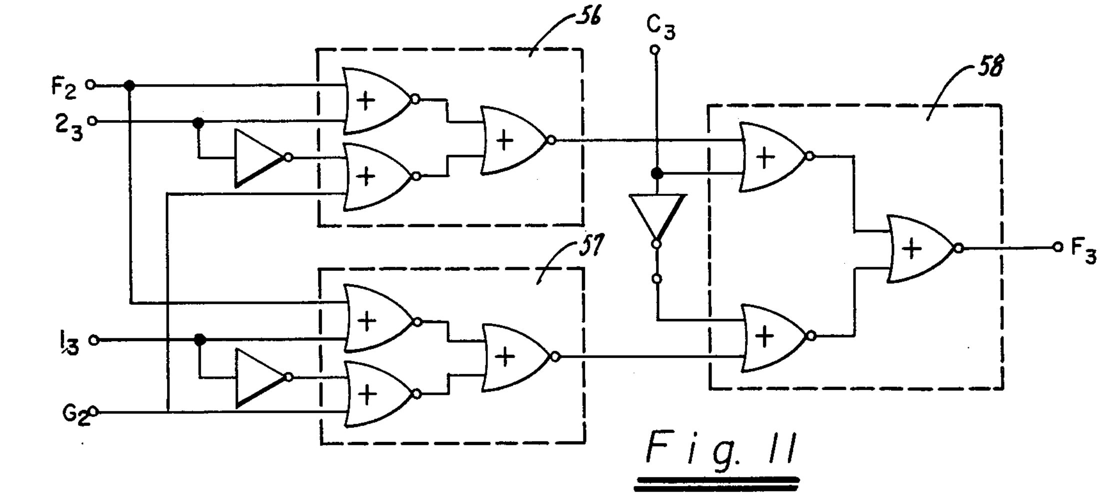
Fig. 11
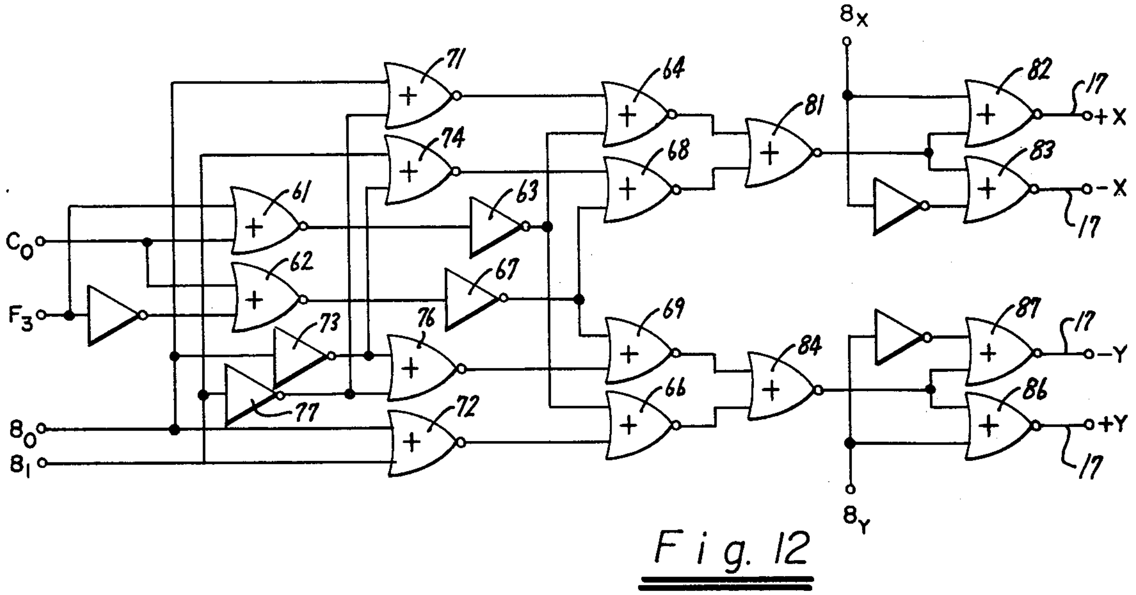
Fig. 12
| OCTANT | $8_0$ | $8_1$ | $8_X$ | $8_Y$ |
|---|---|---|---|---|
| 0 | 0 | 0 | 0 | 0 |
| 1 | 1 | 0 | 0 | 0 |
| 2 | 0 | 1 | 1 | 0 |
| 3 | 1 | 1 | 1 | 0 |
| 4 | 0 | 0 | 1 | 1 |
| 5 | 1 | 0 | 1 | 1 |
| 6 | 0 | 1 | 0 | 1 |
| 7 | 1 | 1 | 0 | 1 |
Fig. 13
INVENTOR.
Richard M. Newell
BY Flehr, Hohbach, Test, Albritton & Herbert
Attorneys

PATTERN GENERATOR AND METHOD

BACKGROUND OF THE INVENTION

This invention pertains generally to data processing systems and more particularly to a pattern generator and method for use in conjunction with a high speed graphic display device.

Remote operation of graphic display devices such as plotters or cathode ray tube devices operated from a digital computer through a narrow bandwidth transmission media is well known to those familiar with the art. The speed of operation of such systems is frequently limited by the data carrying capacity of the transmission media utilized. One method of reducing this limitation is described in copending application Ser. No. 13,570 filed Feb. 24, 1970 and assigned to the assignee of the present invention. In this method, lines extending in any direction are synthesized from line segments consisting of short increments extending in eight reference directions. All of the increments in a given segment are generated simultaneously and applied to the X and Y inputs of a graphical plotter.

Implementation of the method described above requires a pattern generator which can generate the pattern signals for all of the increments of a given segment simultaneously. Conventional pattern generators which can generate only one increment at a time are not suitable for use in this application. One pattern generator which is capable of simultaneously generating a plurality of increments is described in the referenced copending application. This generator uses a standard operational multiplier and produces very satisfactory results when the number of increments per segment is on the order of 3, 9 or 27. One disadvantage of this generator is that the number of components it requires increases at a rate which is generally proportional to the number of increments to be generated. This increase cannot be provided simply by cascading stages but requires substantial restructuring of the generator.

There is, therefore, a need for a new and improved pattern generator which overcomes the foregoing limitations and is suitable for use in a system of the above character.

SUMMARY OF THE INVENTION AND OBJECTS

The pattern generator of the present invention utilizes standard logic elements connected in tree networks to successively combine length and direction input data of different orders of magnitude to produce increasingly higher order functional representations of line segments. This approach permits the capacity of the generator to be increased simply by adding or cascading additional stages. Thus, the capacity of the generator is readily expandable, and a high-capacity generator can be constructed at substantially less cost than heretofore possible.

It is in general an object of the present invention to provide a new and improved pattern generator and method for use in graphic display systems.

Another object of the invention is to provide a pattern generator of the above character in which stages can be cascaded to increase the capacity of the generator.

Another object of the invention is to provide a pattern generator of the above character which is economical to construct.

Additional objects and features of the invention will be apparent from the following description in which the preferred embodiment is set forth in detail in conjunction with the accompanying drawings.

BRIEF DESCRIPTION OF THE DRAWINGS

FIG. 11 is a block diagram of the tree network utilized in the third stage of the pattern generator shown in FIG. 7.

FIG. 12 is a block diagram of a steering network which can be utilized in the pattern generator shown in FIG. 7.

FIG. 13 is a truth table showing the states of the octant input data received by the pattern generator from the direction memory in the system shown in FIG. 2.

DESCRIPTION OF THE PREFERRED EMBODIMENT

Figure 1:
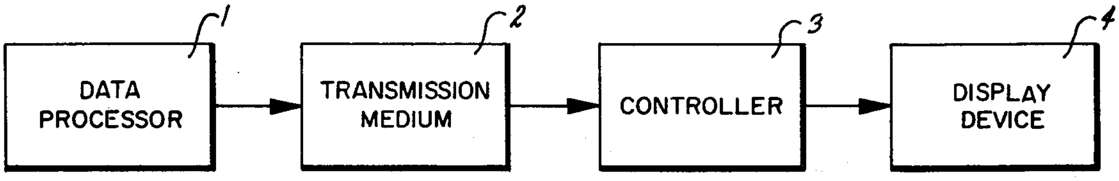
FIG. 1 is a block diagram of one embodiment of a graphic display system which includes a controller utilizing a pattern generator incorporating the present invention.

The graphic display system shown in FIG. 1 includes a data processer or computer 1 which supplies information in the form of digital data over a transmission medium 2 which generally may be a voice grade telephone line or other medium of limited band width and which typically includes modulators and demodulators. The information is supplied to a controller 3 which converts the form of the data transmitted from the computer into a form which is directly useful to a graphic display device 4.

Figure 2:
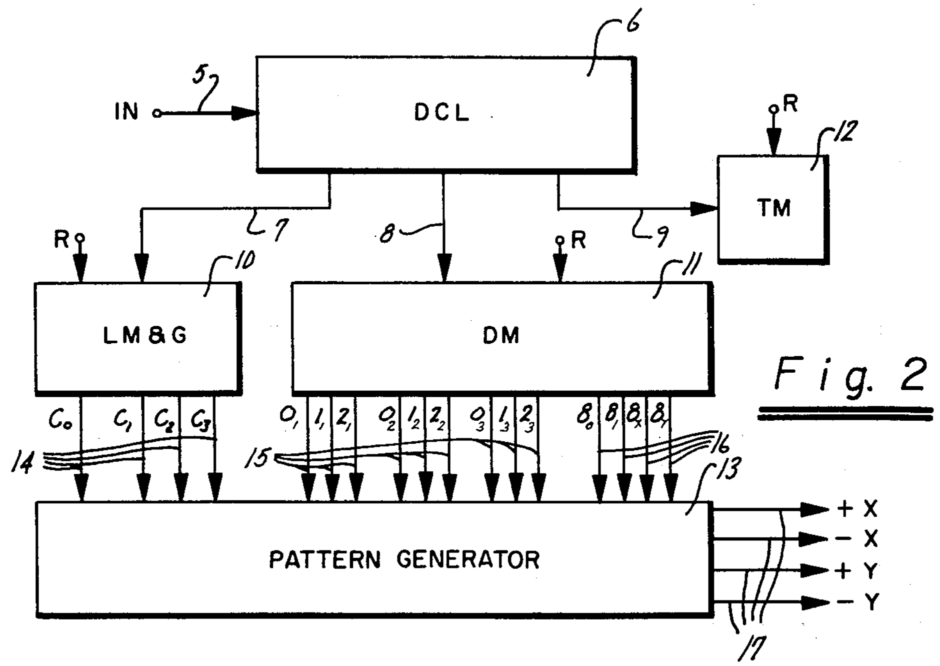
FIG. 2 is a block diagram of the controller shown in FIG. 1.

FIG. 2 is a block diagram of the controller 3 shown in FIG. 1. This controller is generally similar to the controller which is disclosed in copending application Ser. No. 13,570, filed Feb. 24, 1970, and needs only to be described briefly herein to provide a proper background for the pattern generator of the present invention.

The controller is provided with an input terminal 5 which receives data in the form of an electrical signal. This data is decoded and operated upon in a decoder and logic block 6 which routes control signals as necessary through lines 7, 8 and 9 to a length memory and generator 10, direction memory 11 and trace memory 12. Control signals are applied to the pattern generator from the length memory and generator through a plurality of output lines 14, and control signals are applied to the pattern generator from the direction memory through output lines 15 and 16. As is described in the referenced copending application, the signals on the lines 14 and 15 are in ternary form. These signals are generated by a ternary counter in the directional memory which can be of the type disclosed in copending application Ser. No. 64,775, filed of even date. The output of the trace memory can be applied to the plotter to control the operation of its trace or other display means.

The length memory and generator 10, direction memory 11 and trace memory 12 all include memories, and each has an initial state (reset or 0 state) which can be established by the generation of a reset pulse which is applied to each block as indicated by the lines labeled R. In the length memory and generator 10, the initial state can mean that the memorized length is the minimum value, such as 1. In the direction memory 11, the initial state can represent the positive X (+X) direction. In the trace memory 12, the initial state can represent a "no-trace" or "pen-up" condition whereas the other state of the trace memory can represent a "-visible trace" or "pen-down" condition.

One of the lines 14 carries the number of clock pulses $C_0$ corresponding to the number of increments in the line segment which is to be displayed in response to the pattern supplied by the pattern generator 13.

The pattern generator 13 is provided with two X outputs and two Y outputs, identified as +X, −X, +Y, and −Y, respectively. These outputs appear on output lines 17 which are adapted for connection to the graphic display device 4 with which the controller is utilized. If the graphic display device is a plotter, the +X and −X output lines could be connected to the input terminals of the plotter so that the signals supplied on them would control the movement of the chart, and the +Y and −Y lines could be similarly connected to control the pen carriage.

Figure 3:
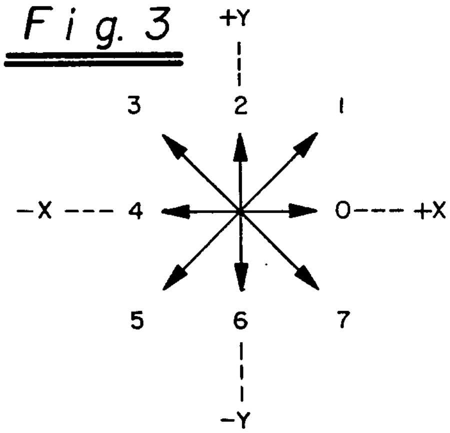
FIG. 3 is a graph showing the eight possible line segments having a length of one increment which can be displayed with the present invention.

FIGS. 3 – 6 illustrate the different line segments which can be produced with some of the possible numbers of increments, together with the patterns which must be generated by the pattern generator in order to produce the segments. FIG. 3 shows the possible line segments which can be displayed when the memorized length or number of increments equals one. For example, a line segment consisting of one increment can be displayed in any one of directions labeled 0 – 7 in FIG. 3, where the starting point of the line segment to be displayed is the center of FIG. 3. This point is defined as the position of the trace of the graphic display device at the time that the display of the line segment is commenced.

The terms octant and quadrant as used throughout this application can be defined with reference to FIG. 3. It will be noted that the line segments shown in FIG. 3 form eight octants, each consisting of 45°. The octant 0 can be defined as the area between the line segment 0 and the line segment 1. Octant 1 is defined as the area between the line segment 1 and the line segment 2, including the line segment 1 but not including the line segment 2, and the remaining octants are similarly defined. Quadrant 1 is defined as including octants 1 and 2, quadrant 2 includes octants 3 and 4, quadrant 3 includes octants 5 and 6, and quadrant 4 includes octants 7 and 8.

Figure 4A:
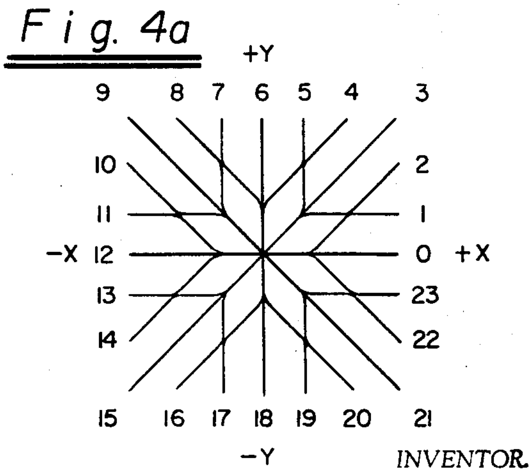
FIG. 4*a* is a graph showing the 24 possible line segments having a length of 3 increments which can be displayed with the present invention.
Figure 4B:
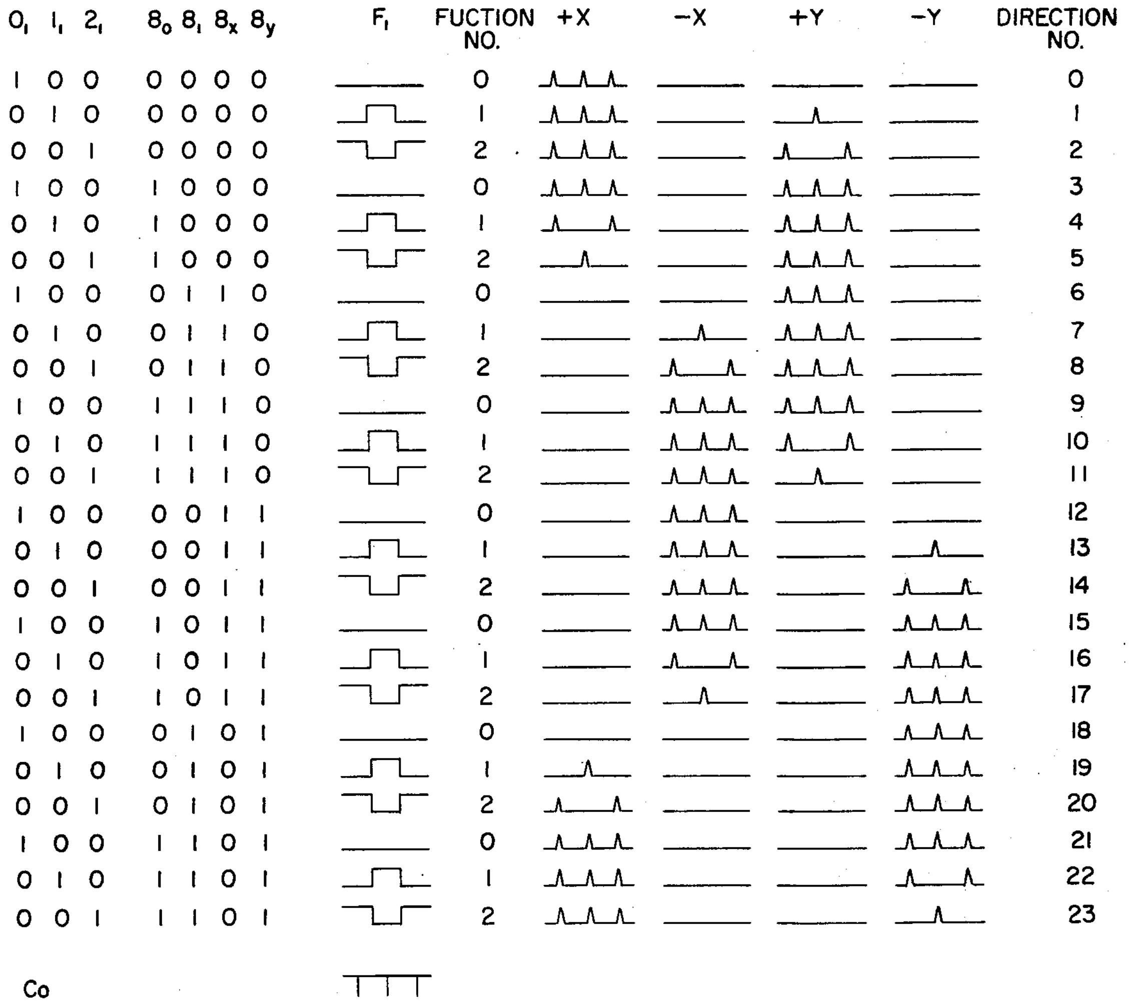
FIG. 4*b* illustrates the direction input signals and the patterns generated by the pattern generator to display the line segments shown in FIG. 4*a*, together with the X and Y output signals delivered by the pattern generator to the display device.
Figure 5:
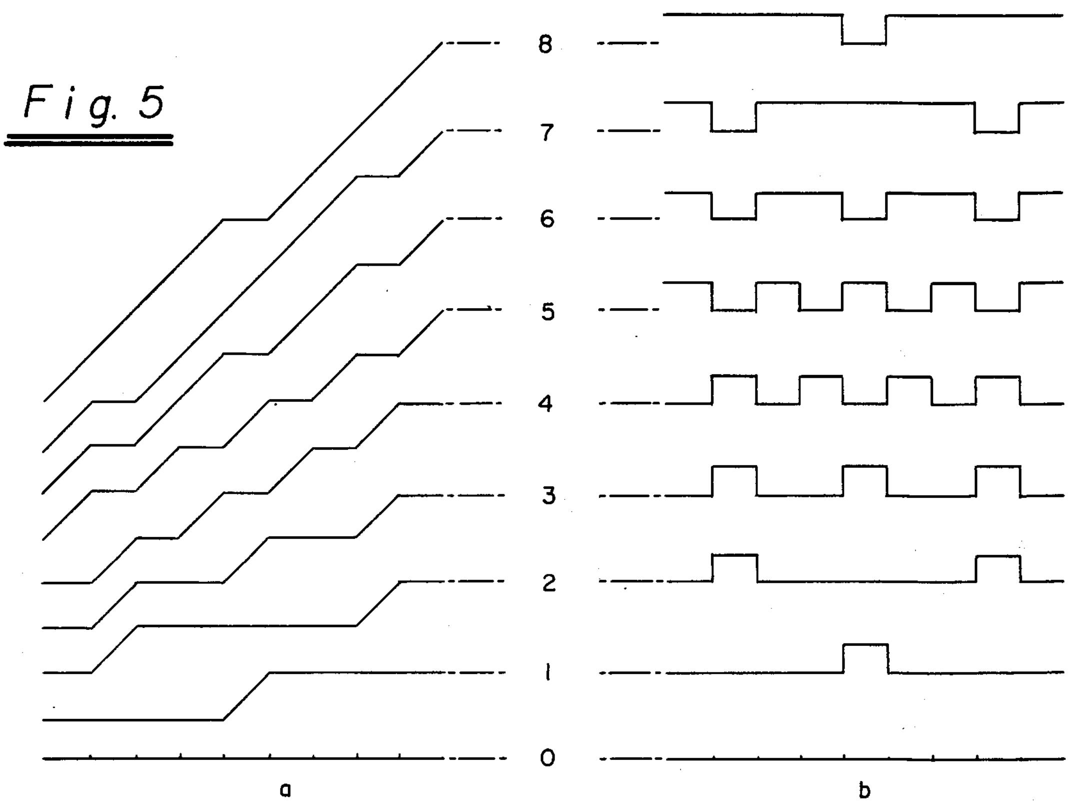
FIG. 5*a* is a graph showing the nine line segments having a length of nine increments which can be displayed in one octant with the present invention.
FIG. 5*b* is a graph showing the signal patterns generated by the pattern generator to display the line segments shown in FIG. 5*a*.

FIG. 4*a* illustrates the 24 possible line segments which can be displayed when each segment has a length of three increments. FIG. 4*b* illustrates the patterns which must be generated by the pattern generator 13 onto lines +X, −X, +Y, and −Y to display the line segments shown in FIG. 4*a*. From these figures it can be seen that there is a symmetrical relationship between the line segments in each of the eight octants and that the 24 line segments require only three basic function configurations. Each such configuration must, of course, be placed in the proper octant to produce the desired line segment. FIG. 4*b* also shows the octant date inputs for the 24 line segments.

FIG. 5*a* illustrates the nine possible line segments which can be displayed in octant 1 when each line segment is 9 increments in length. The functions which must be generated within the pattern generator 13 to display these line segments are shown in FIG. 5*b*.

It should be apparent that the total number of line segments which can be produced in the eight octants can be expressed by the equation $D = 8 \times L$ where $D$ is the total number of line segments and $L$ is the number of increments in each segment.

Figures 6, 8:
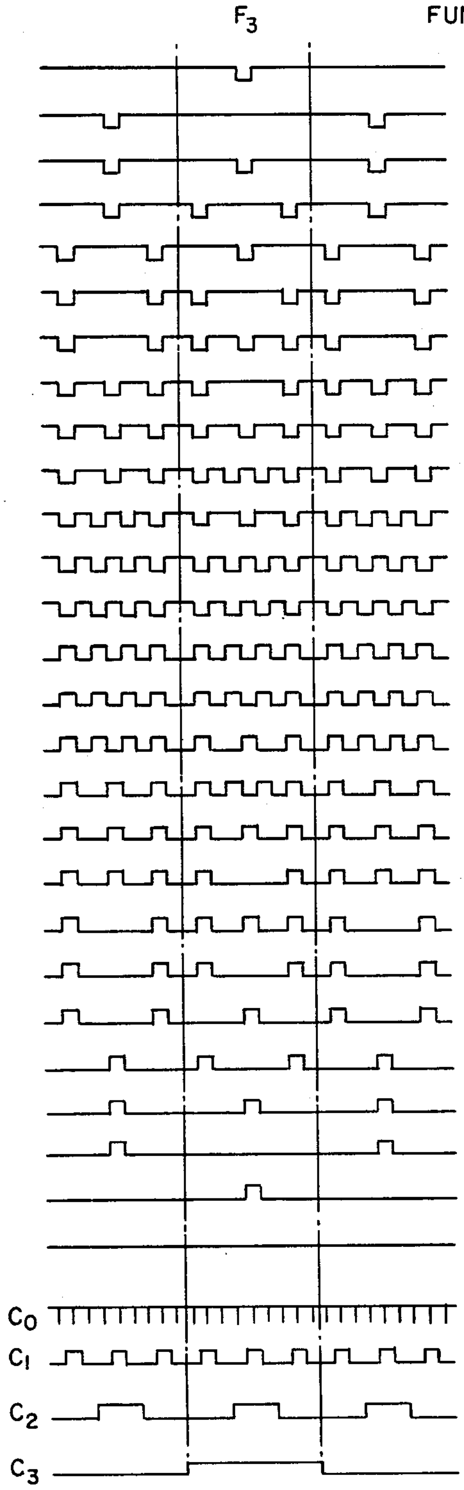
FIG. 6 is a graph showing the signal patterns required from the pattern generator to display 27 different line segments each having a length of 27 increments, in one octant.
FIG. 8 is a table showing the states of the direction input data received by the pattern generator from the direction memory in the system shown in FIG. 2.

FIG. 6 illustrates the functions which the pattern generator 13 produces for line segments consisting of 27 increments. With 27 increments, the possible number of different line segments is 8 × 27, or 216.

Figure 7:
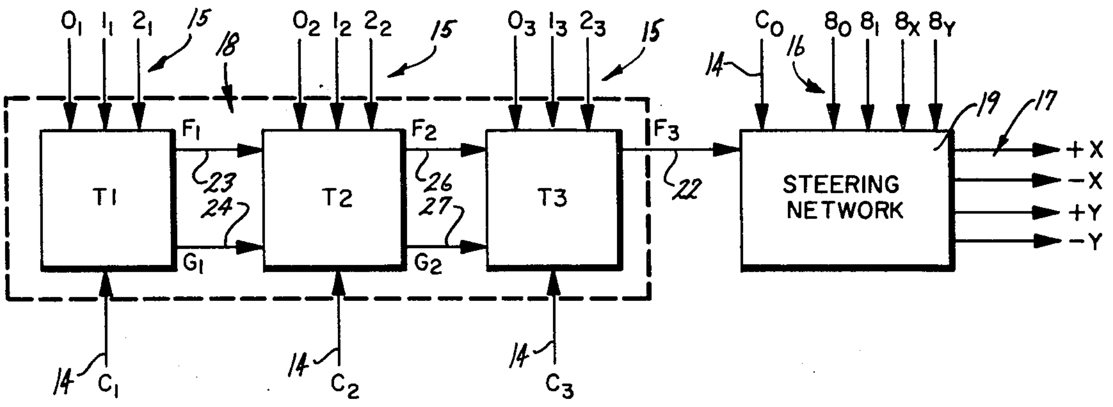
FIG. 7 is a block diagram of a pattern generator incorporating the present invention.

As illustrated in FIG. 7, the pattern generator 13 includes two sections: a digital function generator 18 and a steering network 19. The digital function generator includes a plurality of tree networks T1, T2, T3. The number of tree networks determines the capacity of the function generator, with each such network increasing the capacity by a factor of 3, or an order of 1 in the preferred embodiment which utilizes a ternary counting system. The tree networks are connected together in cascade, with the output of the last network T3 being applied to the steering network 19 through a line 22. As is discussed more fully hereinafter, the signal on the line 22, designated $F_3$ will be one of the functions shown in FIG. 6. This function contains all of the direction and length information necessary to generate in any one octant a line segment consisting of 27 increments.

Each of the tree networks T1 – T3 is connected for receiving direction data through a portion of the lines 15 from the direction memory 11. As pointed out hereinbefore and discussed in more detail in copending application Ser. No. 13,570, filed Feb. 24, 1970, the direction memory includes a ternary counter which delivers the data to the lines 15. The data delivered to the network T1 through the lines 15 is designated $0_1$, $1_1$ and $2_1$ to indicate that it is of the first order of magnitude in the ternary system. The data applied to the network T2 through the lines 15 is designated $0_2$, $1_2$ and $2_2$ to indicate that it is of the second order of magnitude in the ternary system, and similarly the data applied to the network T3 is designated $0_3$, $1_3$, $2_3$.

Each of the tree networks also receives length data on one of the lines 14 from the length generator and memory 10, the length data applied to the three stages being designated $C_1$, $C_2$ and $C_3$, respectively. This data is also produced by a ternary counter with the data $C_2$ being one order of magnitude higher than the data $C_1$ and $C_3$ being one order higher than $C_2$.

The first stage or network T1 produces two functional outputs, $F_1$ and $G_1$, which are applied to the second stage or network T2 through lines 23 and 24, respectively. For the networks shown, the functions $F_N$ and $G_N$ are defined by the following Boolean expressions:

$$F_N=(C_N+[(F_{N\text{-}1}+2_N)\cdot(G_{N\text{-}1}+2_N)])\cdot(C_N+[(F_{N\text{-}1}+1_N)\cdot(G_{N\text{-}1}+1_N)])$$

$$G_N=(C_N+[(F_{N\text{-}1}+0_N)\cdot(G_{N\text{-}1}+0_N)])\cdot(C_N+[(F_{N\text{-}1}+1_N)\cdot(G_{N\text{-}1}+1_N)])$$

where N is the order of magnitude of the stage or network and where $F_0=0$ and $G_0=1$. Thus, for the network T1, $N=1$. It is useful to note that the solutions of $F_N$ and $G_N$ differ only by the difference in the states of $0_N$, $1_N$ and $2_N$, and that the solution of $G_N$ for a particular set of states of $0_N$, $1_N$, and $2_N$ will always be equal to the solution of $F_N$ for the next higher state in ternary form. For example, if $F_N$ is the function number 4 in FIG. 5, then $G_N$ will be the function number 5 in this FIGURE. Thus, it can be said that $F_N$ and $G_N$ are adjacent. For $N=1$ these functions each have one of the forms illustrated in FIG. **4*b***, the particular form depending upon the direction data $0_1$, $1_1$, and $2_1$. The function $F_2$ contains all of the length and direction information necessary to generate a three-increment line segment in any one of the eight octants.

The second stage or network T2 produces second order output functions, $F_2$ and $G_2$, Which are applied to the third stage T3 through lines 26 and 27, respectively. These second order functions are determined by a combination of the first order functions $E_1$ and $G_1$, the direction data $0_2$, $1_2$ and $2_2$, and the length data $C_2$. These second order functions each have one of the forms shown in FIG. **5*b***. The function $F_2$ contains all of the length and direction information necessary to generate a nine-increment line segment in any one of the eight octants.

As mentioned previously, the third stage or network T3 produces a third order function $F_3$ which contains all of the information required to generate a 27 element line segment in any one of the octants. This third order function is determined by the second order functions $F_2$ and $G_2$, the direction data $0_3$, $1_3$ and $2_3$, and the length data $C_3$.

Figure 9:
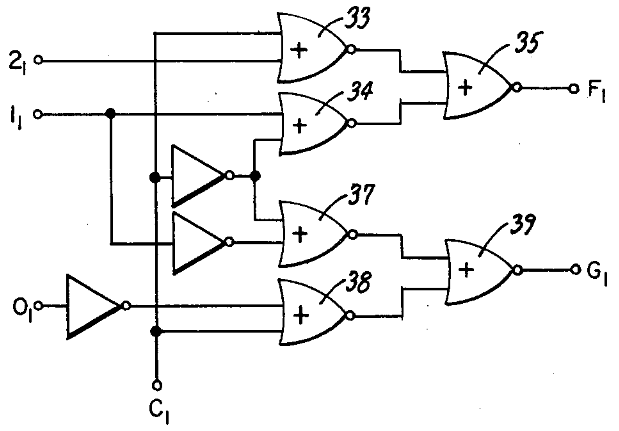
FIG. 9 is a block diagram of the tree network used in the first stage of the pattern generator shown in FIG. 7.
Figure 10:
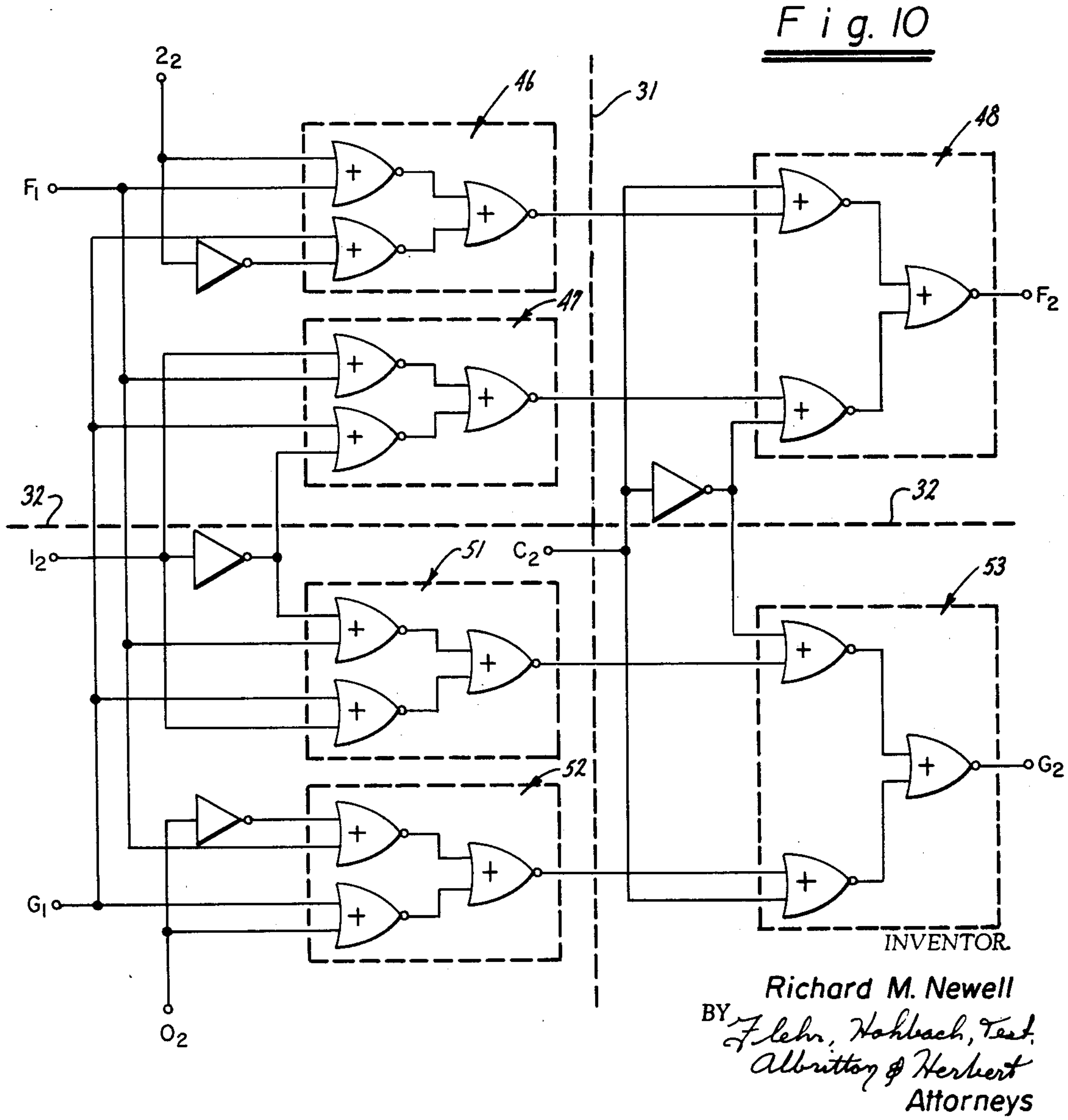
FIG. 10 is a block diagram of the tree network utilized in the second stage of the pattern generator shown in FIG. 7.

The presently preferred embodiments of the tree networks T1, T2 and T3 are illustrated in FIGS. 9 – 11. The circuits are similar in that FIG. 10 illustrates a complete stage, of which the circuits shown in FIGS. 9 and 11 are parts. When the function generator includes more than two stages, the complete circuit of FIG. 10 must be used for all stages except the first and last. Hence, in the embodiment shown in FIG. 7, the network T2 must include the complete circuit. When there is no preceding stage, there are no lower order functions to be received, as is the case with the network T1, and only the portion of the circuit to the right of the dashed line 31 in FIG. 10 is necessary. For clarity, this portion of the circuit is illustrated separately in FIG. 9. When there is no succeeding stage, as is the case with the network T3, there is no need to generate the function $G_N$, and only the portion of the circuit above the line 32 in FIG. 10 is required. This portion of the circuit is shown separately as FIG. 11.

Referring now to FIG. 9, the first stage T1 includes a first line selector consisting of NOR gates 33, 34, and 35 and a second line selector consisting of NOR gates 37, 38, and 39. Since the same line selector configuration is used throughout the function generator, the first will be described in some detail in order to define terms for subsequent use. In the first line selector, the gates 33 and 34 function as input gates, each receiving an input signal at one input terminal and an enabling signal at another input terminal. These terminals will be referred to, respectively, as the input and enabling terminals. The outputs of the gates 33 and 34 are connected to the inputs of the gate 35, and the output of this gate will be referred to as output of the line selector.

The line selector consisting of the NOR gates 33 – 35 receive the direction data signals $1_1$ and $2_1$ as inputs and the length data $C_1$ and its inverse as enabling inputs. The output of this gate is the first order function $F_1$.

The line selector consisting of the gates 37 – 39 receives the inverses of the direction data $0_1$ and $1_1$ as inputs and the length data $C_1$ and its inverse as enabling inputs. The output of this gate is the first order function $G_1$.

As illustrated in FIG. 10, the second tree network or stage T2 includes a first section for generating the second order function $F_2$. This section includes line selectors 46, 47 and 48. The first order functions $F_1$ and $G_1$ are connected as inputs to both of the gates 46 and 47. The second order direction data $2_2$ and its inverse are connected as the enabling inputs for the selector 46, and the second order direction data $1_1$ and its inverse are connected as the enabling inputs for the selector 47. The outputs of the selectors 46 and 47 are connected as inputs to the selector 48, and the second order length data $C_2$ and its inverse are connected as the enabling inputs for this selector. The output of the selector 48 is the second order function $F_2$.

The second stage T2 also includes a section for generating the second order function $G_2$. This section includes line selectors 51, 52 and 53. The first order functions $F_1$ and $G_1$ are connected as inputs to the gates 51 and 52. The second order direction data $1_2$ and its inverse are connected as enabling inputs to the gate 51, and the second order direction data $0_2$ and its inverse are connected as enabling inputs to the gate 52. The outputs of the gates 51 and 52 are connected to the inputs of the gate 53, and the second order length data $C_2$ and its inverse are connected as enabling inputs to this gate. The second order output function $G_2$ appears at the output of the gate 53.

As illustrated in FIG. 11, the third stage of tree network T3 includes line selectors 56, 57 and 58 for producing the third order output function $F_3$. The second order output functions $F_2$ and $G_2$ are connected to the inputs of both of the gates 56 and 57. The third order direction data $2_3$ and its inverse are connected to the enabling inputs of the gate 56, and the third order direction data $1_3$ and its inverse are connected to the enabling inputs of the gate 57. The outputs of the gates 56 and 57 are connected to the inputs of the gate 58, and the third order length data $C_3$ and its inverse are connected to the enabling inputs of this gate. The third order input function $F_3$ appears at the output of the gate 58.

As pointed out previously, the output function $F_3$ contains all of the length and direction information necessary to generate a 27 increment line segment in any one of the eight octants. The steering network 19 generates the output patterns necessary for the display device to generate a line segment in the desired octant. Referring again to FIG. 7, it can be seen that, in addition to the output function $F_3$, the steering network also receives inputs from the length memory and generator 10 and from the direction memory 11. Clock pulses, designated $C_0$, are applied from the length memory generator through one of the lines 14. Direction data, designated $8_0$, $8_1$, $8_x$, and $8_y$ is applied to the network through the lines 16. As is discussed in detail in copending application Ser. No. 13,570, filed Feb. 24, 1970, the data $8_0$ through $8_y$ is generated by the octal portion of the direction memory and is therefore in octal form. This octal data carries the information which determines the octant in which the line segment represented by the output function $F_3$ is to be displayed. The steering network steers the clock pulses $C_0$ to the X and Y output lines 17 in accordance with the octant data on the lines 16 in a sequence in accordance with the function $F_3$.

FIG. 12 is a circuit schematic of the presently preferred embodiment of the steering network, and FIG. 13 shows the states of the direction data $8_0$, $8_1$, $8_x$, and $8_y$ on the signal lines 16 for each of the eight possible octants. The data $8_0$ and $8_1$ inputs are used to steer the clock pulses into the appropriate ±X and or ±Y selection gates. The data signals $\mathbf{8_x}$ and $\mathbf{8_y}$ are then used to steer the pulses into the appropriate X and Y signal output lines 17. The function $F_3$ is combined with the input clocks $C_0$ to generate an appropriate pattern of pulses and an inversely related pattern of pulses.

The steering network includes input NOR gates 61 and 62 to which the clock signal $C_0$ is applied as an input. The function $F_3$ and its inverse are also connected as inputs to these gates. The output of the NOR gate 61 is applied to an inverter 63 whose output is a pattern of pulses defined by the Boolean expression $C_0 + F_3$. This output is applied as an input to NOR gates 64 and 66. The output of the NOR gate 62 is applied to an inverter 67 whose output is a pattern of pulses defined by the Boolean expression $C_0 + F_3$. This output is applied to the inputs of the NOR gates 68 and 69.

The first octant data signal $8_0$ is applied to the inputs of NOR gates 71 and 72 and to an inverter 73 whose output is applied to the NOR gates 74 and 76. The octant data signal $8_1$ is applied to the NOR gates 72 and 74 and to an inverter 77 whose output is applied to the NOR gates 71 and 76. The outputs of the NOR gates 71, 74, 72, and 76 are applied to the inputs of the NOR gates 64, 68, 66 and 69, respectively, and perform the function of selecting whether the pulse pattern $C_0 + F_3$ or the pulse pattern $C_0 + F_3$ or both are to be coupled through to the output signal lines 17.

The outputs of the NOR gates 64 and 68 are applied to the inputs of a NOR gate 81 whose output is applied to the inputs of NOR gates 82 and 83. The octant data signal $8_x$ is applied to the NOR gate 82, and its inverse is applied to the NOR gate 83, thus controlling whether the pulse pattern from the NOR gate 81 is coupled to the +X output line or to the −X output line. Similarly the outputs of the NOR gates 66 and 69 are applied to a NOR gate 84 whose output is connected to the inputs of NOR gates 86 and 87. The octant data signal $8_y$ is applied to the gate 86 and the inverse of this signal is applied to the gate 87, thus controlling whether the pulse pattern from the NOR gate 84 is coupled to the +Y output line or to the −Y output line.

Operation and use of the pattern generator can now be described briefly. Initially, let it be assumed that it is desired to generate a line segment of 27 increments in the direction 0, that is, a horizontal line in the +X direction. The states of the octant data lines 16 will be as shown in FIG. 13 for the octant 0, the states of the direction data lines 15 will be as shown in FIG. 8 for the function number 0, and the length data signals $C_0$ through $C_3$ on lines 14 will be as shown in FIG. 6 for the function 0. FIG. 6 also shows the form of the function $F_3$ required for a line 27 increments long in the direction 0.

From FIG. 8 it can be seen that the direction data inputs $1_1$, $2_1$, $1_2$, $2_2$, $1_3$ and $2_3$ are all low for a line in the direction 0. Referring now to FIG. 9, it can be seen that with data inputs $1_1$ and $2_1$ both low, the output of the line selector consisting of gates 33– 35 will always be low, regardless of the state of the length data input $C_1$. Thus, the first order output function $F_1$ will be low for all 27 increments or time intervals. In this particular example, it is not necessary to consider the operation of the remainder of the circuits shown in FIG. 9.

Now, referring to FIG. 10, with the data inputs $2_2$ and $1_2$ both low, the outputs of the line selector 46 and 47 are both low. This means that both of the inputs to the line selector 48 are low, causing the second order output function $F_2$ to be low for all 27 time intervals or increments.

The circuit of FIG. 11 is similar in logical operation to that of the portion of FIG. 10 described above, and the third order output function $F_3$ will likewise be low for all 27 time intervals. Hence, it can be seen that the form of the function $F_3$ is as shown in FIG. 6 for the function number 0.

From FIG. 13, it can be seen that the octant data signals $8_0$, $8_1$, $8_x$ and $8_y$ are all low since a line segment of the direction 0 is in the octant 0. Referring now to FIG. 12, the function $F_3$ is combined with the clock signal $C_0$ in such manner that there will be a pulse on the line 88 at the output of the inverter 63 during each time interval when the function $F_3$ is low and a pulse on the line 89 at the output of the inverter 67 during each time interval when the function $F_3$ is high. In this example, since the function $F_3$ is continuously low, the line 89 will be a steady high with no pulses causing the output of the NOR gate 68 to remain low and the line 88 will have a pulse in every time interval. The inverters 73 and 77 and the NOR gates 71, 73, 67 and 76 act as a one-of-four decoder where only one of the four NOR gate outputs can be high at a time, as determined by the input signals $8_0$ and $8_1$. In this example, the outputs of the NOR gates 71, 73 and 76 are all low and the NOR gate 72 is high. Since the outputs of the NOR gates 71, 73 and 76 are all low, the pulses on the line 88 will be coupled through to the +X output line in inverted polarity. These pulses will not pass to the −X line since the NOR gate 83 is held low by the inverse of the $8_x$ signal.

Since the line 89 is high, the output of the NOR gate 69 is low, and since the output of the NOR gate 72 is high, the output of the NOR gate 66 is low. This causes the output of the NOR gate 84 to be high which causes both the +Y and −Y output lines to remain low.

The result is a pulse in each time interval, or 27 pulses for a line segment consisting of 27 increments, on the +X line and no pulses on any other output line.

Next let it be assumed that it is desired to generate a line segment of 27 increments in the direction number 67. The direction data input lines 15 will contain the data indicated by the function number 13 in FIG. 8, and the octant data lines 16 will contain the data indicated by the octant number 2 in FIG. 13. The direction data signals on the lines 14 are as shown in FIG. 6 for the function number 13.

Referring to FIG. 9, since $2_1$ is low and $1_1$ is high, the $C_1$ input to the line selector consisting of gates 37 – 39 is blocked, but the $C_1$ input is passed through to the output $G_1$ so that $G_1$ equals $C_1$.

Referring to FIG. 10, with $2_2$ low, the signal $F_1 = C_1$ is coupled through to the output of the line selector 46. With $1_2$ high, the line selector 47 passes the signal $G_1 = C_1$ through to its output, and the line selector 51 passes the signal $F_1 = C_1$ through to its output. With $0_2$ low, the line selector 52 passes the signal $G_1 = C$ to its output. During the time intervals when $C_2$ is low, the line selector 48 passes the output of the line selector 46 to its output, and the second order output function $F_2$ equals $F_1$, i.e., $F_2 = F_1 = C_1$. During the intervals when $C_2$ is high, the output of the line selector 47 passes through the line selector 48, and $F_2 = G_1 = C_1$. During the time intervals when $C_2$ is low, the line selector 53 passes the output of line selector 52 to its output, and the second order output function $G_2 = G_1 = C_1$. During the time intervals when $C_2$ is high, the line selector 53 passes the output of line selector 51 to its output, and $G_2 = F_1 = C_1$. The resulting functions $F_2$ and $G_2$ are thus as shown in FIG. **5*b*, $F_2$ being the function number 4 and $G_2$ being the function number 5**.

Referring now to FIG. 11, with $2_3$ low, the line selector 56 passes the function $F_2$ to its output. With $1_3$ high, the line selector 57 passes the function $G_2$ to its output. During the time intervals when $C_3$ is low, the line selector 58 passes the function $F_2$ to its output, and during the time intervals when $C_3$ is high, the line selector 58 passes the function $G_2$ to its output. The resulting third order function $F_3$ is shown in FIG. 6 as the function number 13.

Referring to FIG. 12, during each time interval when the function $F_3$ is low, a clock pulse will be coupled to the line 88, and when $F_3$ is high, clock pulses will be coupled to the line 89. For lines in the octant number 2, as in the present example, the signal $8_0$ is low and $8_1$ is high. This causes the outputs of the NOR gates 74, 72 and 76 to be low, and the output of the NOR gate 71 to be high. With the NOR gate 71 high, the NOR gate 64 is blocked, but the NOR gate 68 is enabled to couple the clock pulses on the line 89 to the output of the NOR gate 81. With the signal $8_x$ high, the NOR gate 82 is blocked so that no pulses appear on the +X output line, but the NOR gate 83 is enabled so that a pattern of inverted clock pulses appears on the −X output line. If there are 27 pulses in the clock signal $C_0$ and if the pulses are numbered consecutively starting with 1, then the pattern of inverted pulses on the −X line would consist of all of the even numbered pulses, or 13 equally spaced positive pulses. With the outputs of the gates 72 and 76 low, the gates 69 and 66 are enabled to couple the pulses on the lines 89 and 88, respectively, to the inputs of the gate 84. Thus, the output of the NOR gate 88 is simply the clock input signal $C_0$. Since the input $8_y$ is low, the NOR gate 87 is blocked, so that no pulses appear on the −Y output line. However, the NOR gate 86 is enabled to invert the output of the NOR gate 84, passing 27 equally spaced positive pulses to the +Y output line.

The X and Y outputs generated in the foregoing example will be applied to the display device to produce a line segment having a first increment in the +Y direction, a second increment in the −X, +Y direction, a third increment in the +Y direction, a fourth increment in the −X, +Y direction, and so on for 27 increments.

Although the invention has been described with specific reference to a pattern generator having three tree networks or stages, any number of stages can be utilized, it only being necessary to provide appropriate length and direction input data on the lines 14 and 15 for each of the stages. The number of increments per line segment and the total number of different line segments which can be generated is proportional to the number of stages provided. In a system such as that disclosed in which the data is presented in ternary form, these numbers increase as powers of three. If desired, number systems having bases other than 3 can be utilized. Likewise, although the generator has been described and illustrated as using the NOR gates and positive NOR logic elements, other types of logic and logic elements can be used.

It is apparent from the foregoing that a new and improved pattern generator has been provided. While only the presently preferred embodiment has been described, as will be apparent to those familiar with the art, certain changes and modifications can be made without departing from the scope of the invention as defined by the following claims.

I claim:

1. In a controller for generating line segment signal patterns representing vectors with each pattern being characterized by at least two parameters including length and direction, input means for receiving input information in the form of digitally coded signals, memory means for memorizing the direction parameter of at least one line segment signal pattern previously generated, means for recognizing if said digitally coded signals contain change instructions for said memorized direction parameter, the recognizing means also including means for updating said memorized parameter in response to any change instruction, said parameter being incremented or decremented according to a predetermined base number system, said updated memorized parameter having a format of a plurality of successive orders of the radix of said number system, the improvement comprising generator means including a plurality of logic means respectively associated with and responsive to said plurality of orders of said radix, the logic means associated with said lowest order radix being responsive to such order portion of said updated parameter for generating two output signal patterns representing line segments having a number of increments in accordance with the value of said radix raised to said lowest order, said two signal patterns being adjacent each other, the logic means associated with the next to lowest order radix being responsive to such order portion of said updated parameter and to said two output signal patterns of said lowest order logic means for generating at least one output signal pattern representing a line segment having a number of increments in accordance with the value of said radix raised to said next to lowest order radix, such pattern being a composite of said two output signal patterns as determined by said second order format.

2. A controller as in claim 1 where said memory means also includes a length memory and said recognizing means also updates said length memory said updated length memory having a format similar to said direction memory, the respective order radices of said length memory providing information respectively to said plurality of logic means for generating said composite output signal pattern.

3. A controller as in claim 1 where said signal patterns are identical for each of a predetermined plurality of sectors of a circle and where said pattern generator includes steering network means coupled to said memory means and responsive to said updated memorized parameter for steering said composite output signal pattern to a sector as determined by said updated parameter.

4. In a pattern generator for generating output signal patterns representing line segments consisting of a predetermined number of discrete increments, means for providing data representing the length and direction of the segments said means including data lines arranged in groups carrying the data in successive orders of magnitude in a predetermined number system, a first stage of logic means connected to the group of data lines carrying the lowest order length and direction data, said first stage combining said lowest order data to produce a first order functional representation of a line segment and at least one additional stage of logic means, each additional stage being connected to the preceding stage and to the data lines carrying the next order length and direction data, each additional stage combining the functional representation from the preceding stage together with the next order length and direction data to produce the next higher order functional representation of the line segment in such manner that each lower order functional representation can form part of at least two different higher order functional representations of a line segment.

5. A pattern generator as in claim 4 wherein the number of stages is equal to the exponential power to which the base of the number system utilized in arranging the data must be raised to equal the number of increments in each line segment.

6. A pattern generator as in claim 4 wherein the number system utilized is a ternary system.

7. A pattern generator as in claim 4 further including steering means for combining the highest order functional representation with directional data representing the orientation of the line segment to provide an output signal pattern representing the line segment.

8. A pattern generator as in claim 4 wherein each of said stages of logic means includes a plurality of logic elements connected in a tree network to provide a unidirectional flow of data, said tree network allowing a plurality of said stages to be serially cascaded to expand the capacity of said generator.

9. A pattern generator as in claim 8 wherein said logic elements are NOR gates.

10. In a method for generating line segment signal patterns from data in the form of length and direction parameters, the steps of arranging the length parameters and the direction parameters in a format according to increasing orders of magnitude, combining the length parameter and the direction of the lowest order of magnitude to form a lowest order functional representation of a line segment, and combining said lowest order functional representation with the length parameter and the direction parameter of the next higher order to form a next higher order functional representation of the line segment.

11. A method as in claim 10 together with the additional step of combining length and direction parameters of a still higher order of magnitude with said next higher order functional representation.

12. A method as in claim 11 together with the additional step of combining the highest order functional representation of the line segment with additional parameters representing the orientation of the line segment to steer the line signal pattern formed by said highest order representation to a sector determined by said additional parameters.

* * * * *